(12) United States Patent  
Suzuki et al.

(10) Patent No.: US 8,821,025 B2  
(45) Date of Patent: Sep. 2, 2014

(54) ROLLING BEARING

(71) Applicant: JTEKT Corporation, Osaka (JP)

(72) Inventors: Masahiro Suzuki, Kashiba (JP); Junji Murata, Kashiba (JP); Kazuyoshi Yamakawa, Nishinomiya (JP); Toshiyuki Saito, Kashiba (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 14/026,784

(22) Filed: Sep. 13, 2013

(65) Prior Publication Data

US 2014/0079348 A1    Mar. 20, 2014

(30) Foreign Application Priority Data

Sep. 20, 2012  (JP) ................................. 2012-206812

(51) Int. Cl.
*F16C 33/58* (2006.01)
*F16C 33/66* (2006.01)
*F16C 19/06* (2006.01)

(52) U.S. Cl.
CPC ............ *F16C 33/6696* (2013.01); *F16C 33/585* (2013.01); *F16C 33/6651* (2013.01); *F16C 19/06* (2013.01)
USPC .......................................... 384/513; 384/473

(58) Field of Classification Search
CPC ............. F16C 33/6607; F16C 33/6614; F16C 33/664; F16C 33/6651; F16C 33/5596; F16C 33/585
USPC ................... 384/462, 463, 513, 569, 473, 475
See application file for complete search history.

(56) References Cited

U.S. PATENT DOCUMENTS

| | | | |
|---|---|---|---|
| 5,482,637 A * | 1/1996 | Rao et al. ...................... | 508/100 |
| 5,498,086 A * | 3/1996 | Ou ................................ | 384/491 |
| 6,238,744 B1 * | 5/2001 | Magoulick et al. .......... | 427/369 |
| 6,371,656 B1 * | 4/2002 | De Vries et al. ............. | 384/565 |
| 7,543,385 B2 * | 6/2009 | Kaminski et al. .......... | 29/898.13 |
| 2013/0223779 A1 | 8/2013 | Onda et al. | |

FOREIGN PATENT DOCUMENTS

| | | |
|---|---|---|
| CN | 102226459 A | 10/2011 |
| JP | A-2009-108901 | 5/2009 |
| JP | A-2009-108963 | 5/2009 |
| JP | A-2009-121554 | 6/2009 |
| JP | A-2009-121659 | 6/2009 |
| JP | A-2012-087864 | 5/2012 |
| WO | WO 2008069133 A1 * | 6/2008 ............ F16C 33/34 |

OTHER PUBLICATIONS

Jun. 10, 2014 Extended European Search Report issued in European Patent Application No. 13184557.0.

\* cited by examiner

*Primary Examiner* — Phillip A Johnson
(74) *Attorney, Agent, or Firm* — Oliff PLC

(57) ABSTRACT

A rolling bearing includes an inner ring, an outer ring, and a plurality of rolling elements. A large number of inside dimples in which a liquid lubricant is retained and a large number of outside dimples in which a solid lubricant is retained are formed in at least one of an inner ring raceway surface and an outer ring raceway surface. The inside dimples are formed in a contact region at which the raceway surface contact the rolling elements or in a section of each non-contact region, the section being close to the contact region. The outside dimples are formed outside a portion in which the inside dimples are formed.

2 Claims, 4 Drawing Sheets

ROLLING BEARING

INCORPORATION BY REFERENCE

The disclosure of Japanese Patent Application No. 2012-206812 filed on Sep. 20, 2012 including the specification, drawings and abstract, is incorporated herein by reference in its entirety.

BACKGROUND OF THE INVENTION

1. Field of the Invention

The invention relates to a rolling bearing.

2. Description of Related Art

If an amount of a liquid lubricant (mainly, lubricating oil) supplied to a rolling bearing becomes excessively large, stirring resistance of the lubricant during the rotation of the bearing increases, and thus it becomes difficult to achieve lower torque. In order to suppress an increase in the stirring resistance of the lubricating oil, for example, a rolling bearing described in Japanese Patent Application Publication No. 2012-87864 (JP 2012-87864 A) has been used. According to JP 2012-87864 A, an inner ring and an outer ring are provided with respective bearing ring extension portions extending in an axial direction, and an oil supply and discharge mechanism that supplies lubricating oil, which also serves as a bearing cooling medium, into a bearing and that discharges the lubricating oil out of the bearing is formed in the bearing ring extension portions. Further, a technique in which a solid lubricant instead of a liquid lubricant is applied on a raceway surface for balls in a bearing has been employed in order to suppress stirring resistance.

In the rolling bearing described in JP 2012-87864 A, due to the structure in which the inner ring and the outer ring are provided with the respective bearing ring extension portions extending in the axial direction, each of the weight and the axial length of the rolling bearing increases by an amount corresponding to the bearing ring extension portions, resulting in an increase in the size of the rolling bearing. On the other hand, in the case where the solid lubricant is used instead of the liquid lubricant, there are problems that, for example, the solid lubricant is inferior in heat dissipation characteristics to the liquid lubricant and abrasion powder may adversely affect lubrication.

SUMMARY OF THE INVENTION

One object of the invention is to provide a rolling bearing configured such that an adverse effect from the use of a solid lubricant and stirring resistance due to the use of a liquid lubricant are suppressed without causing increases in the size and weight of the rolling bearing.

An aspect of the invention relates to a rolling bearing including: an inner ring; an outer ring arranged radially outward of the inner ring via an annular space so as to be concentric with the inner ring; and a plurality of rolling elements rollably disposed between an inner ring raceway surface formed on an outer peripheral face of the inner ring and an outer ring raceway surface formed on an inner peripheral face of the outer ring. A large number of inside dimples in which a liquid lubricant is retained and a large number of outside dimples in which a solid lubricant is retained are formed in at least one of the inner ring raceway surface and the outer ring raceway surface. The inside dimples are formed in a contact region at which the raceway surface contact the rolling elements or in a section of each non-contact region, the section being close to the contact region. The outside dimples are formed outside a portion in which the inside dimples are formed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the invention will be described below.

Figure 1:
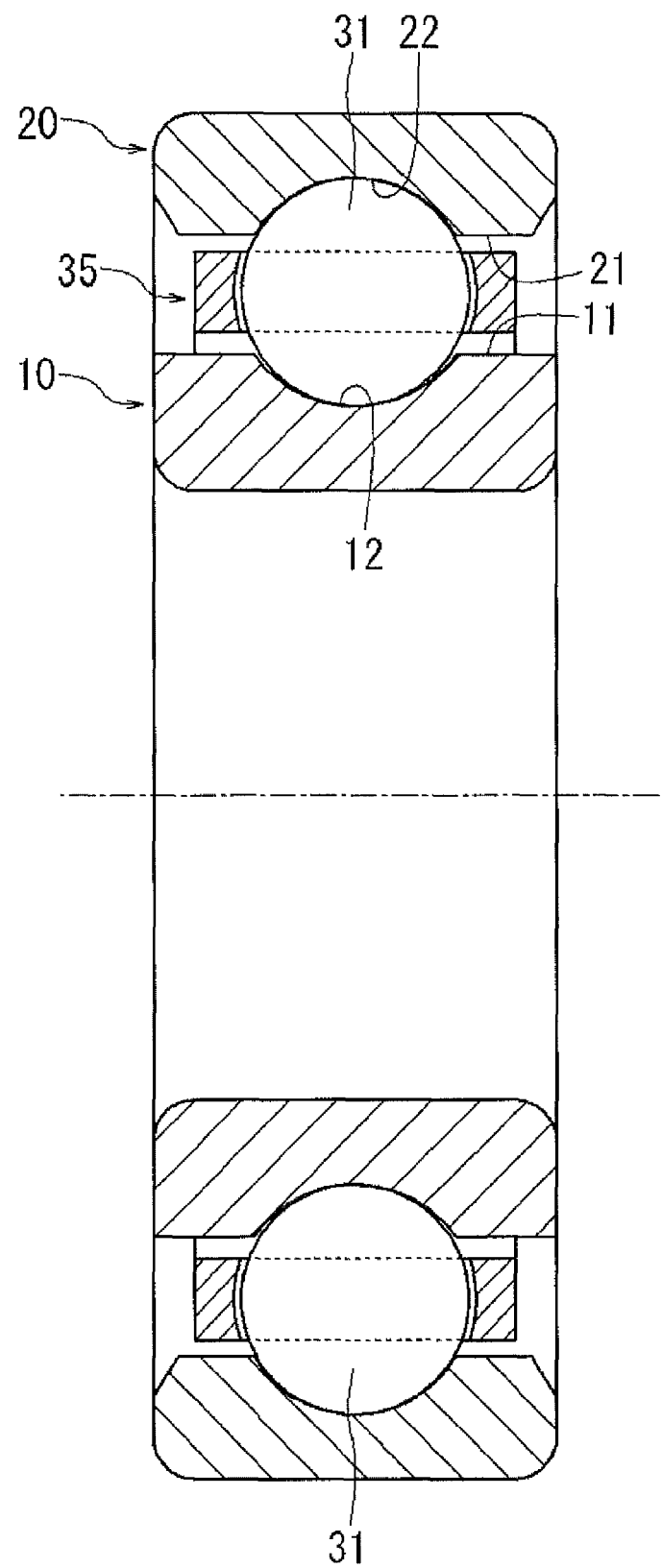
FIG. 1 is a sectional view of a rolling bearing according to an embodiment of the invention, the sectional view being taken along the axial direction of the rolling bearing.

An embodiment of the invention will be described with reference to the accompanying drawings. In the present embodiment, a case where a deep groove ball bearing is used as a rolling bearing will be described. As illustrated in FIG. 1, the deep groove ball bearing used as the rolling bearing includes an inner ring 10, an outer ring 20, a plurality of balls 31 used as rolling elements, and a cage 35. The inner ring 10 is formed in a cylindrical shape, and has an inner ring raceway surface 12 that is formed in an axially center portion of an outer peripheral face 11 and that defines an arc-shaped annular groove.

The outer ring 20 is formed in a cylindrical shape and has an inner diameter that is larger than an outer diameter of the inner ring 10, and is arranged radially outward of the inner ring 10 via an annular space so as to be concentric with the inner ring 10. The outer ring 20 has an outer ring raceway surface 22 that is formed in an axially center portion of an inner peripheral face 21 and that defines an arc-shaped annular groove. The balls 31 are rollably arranged between the inner ring raceway surface 12 and the outer ring raceway surface 22 while being held by the cage 35.

Figure 2:
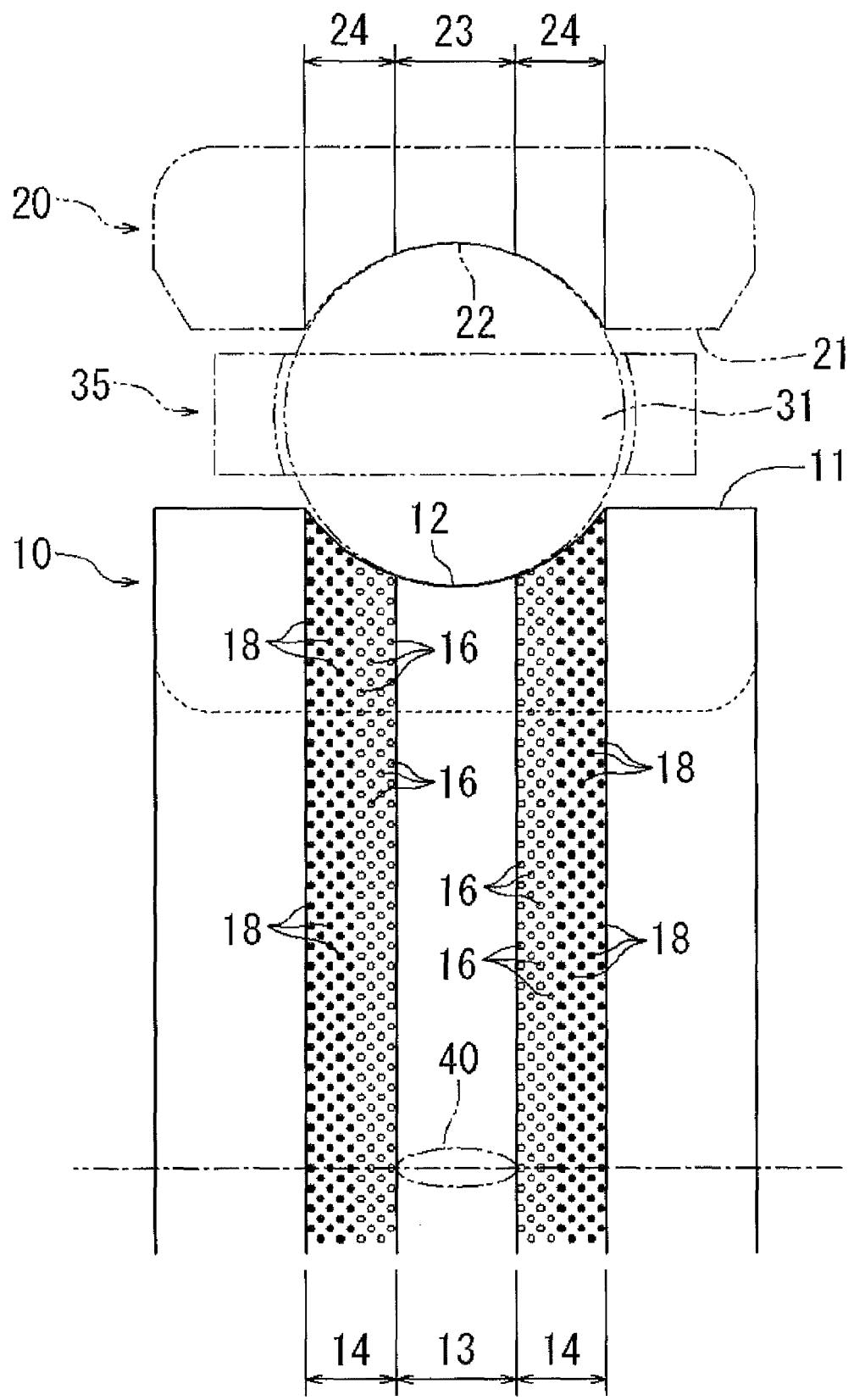
FIG. 2 is a side view of an inner ring, illustrating an inner ring raceway surface according to the embodiment of the invention.
Figure 3:
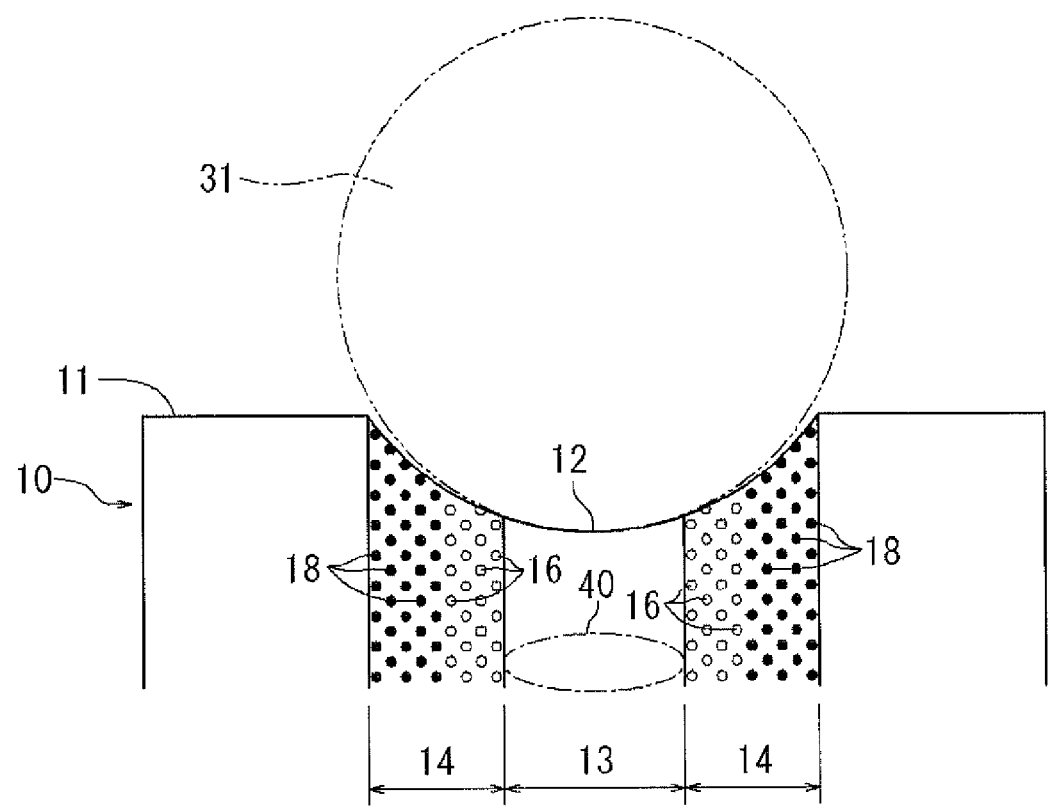
FIG. 3 is an enlarged side view illustrating a large number of inside dimples and a large number of outside dimples formed in the inner ring raceway surface according to the embodiment of the invention.

As illustrated in FIG. 2, the inner ring raceway surface 12 and the outer ring raceway surface 22 respectively have contact regions 13, 23 that are brought into contact with the balls 31, and non-contact regions 14, 24 that are formed outsides respective end portions of the contact regions 13, 23 so as to be adjacent to the respective end portions of the contact regions 13, 23, and that are not brought into contact with the balls 31. Note that an ellipse indicated by a long dashed double-short dashed line in FIG. 2 and FIG. 3 is a contact ellipse 40 at which the inner ring 10 contacts the ball 31, and each of the contact regions 13, 23 has an axial width that corresponds to a major axis of the contact ellipse 40. FIG. 2 and FIG. 3 illustrate the contact ellipse 40 in a case where a light load acts in a direction orthogonal to the axial direction. In this case, the length of the major axis of the contact ellipse 40 becomes shorter than the width of the contact region 13 (23). The contact ellipse 40 may be extend into the non-contact regions 14 (24) depending on the magnitude of a load applied to each of the balls 31. For example, when the magnitude of a load applied to each of the balls 31 is a medium magnitude (medium load), outer edges of the contact ellipse 40 in the major axis direction enter the regions where inside dimples 16, which will be described later, are formed. When the magnitude of a load applied to each of the balls 31 is a high magnitude (heavy load), the outer edges of the contact ellipse 40 in the major axis direction enter the regions where outside dimples 18, which will be described later, are formed.

As illustrated in FIG. 3, a large number of the inside dimples 16 and a large number of the outside dimples 18 are formed in at least one of the inner ring raceway surface 12 and the outer ring raceway surface 22. In the present embodiment, the inside dimples 16 and the outside dimples 18 are formed in the inner ring raceway surface 12. Further, the inside dimples 16 are formed in the contact region 13 of the inner ring raceway surface 12 or in a section of each non-contact region 14, the section being close to the contact region 13. The outside dimples 18 are formed outside a portion in which the inside dimples 16 are formed. In the present embodiment, the inside dimples 16 are formed in a section of each non-contact region 14, the section being close to the contact region 13, that is, a contact region 13-side section of each non-contact region 14.

In the present embodiment, the inside dimples 16 and the outside dimples 18 each have a diameter within a range from 0.2 mm to 0.4 mm and a depth of approximately 5 μm. The inside dimples 16 and the outside dimples 18 are easily formed by shot blasting. At this time, the contact region 13 that is located inward of the sections where the inside dimples 16 are formed is masked. In addition, it is desirable that the inside dimples 16 be formed in outer sections within the contact region 13 or the non-contact regions 14 outside the contact region 13 so that the rolling performance of the balls 31 are not lowered.

Figure 4:
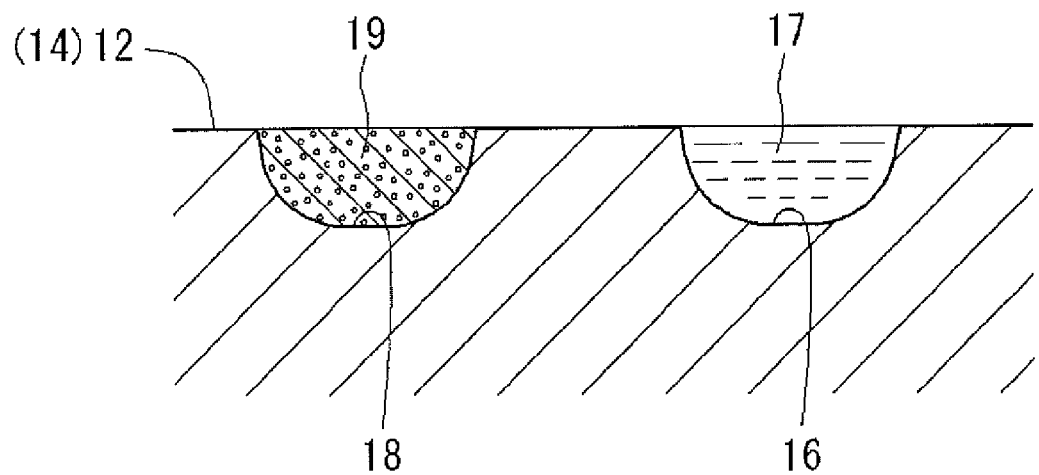
FIG. 4 is an enlarged sectional view illustrating the inside dimple and the outside dimple of the inner ring raceway surface according to the embodiment of the invention, the sectional view taken along the axial direction.
Figure 5:
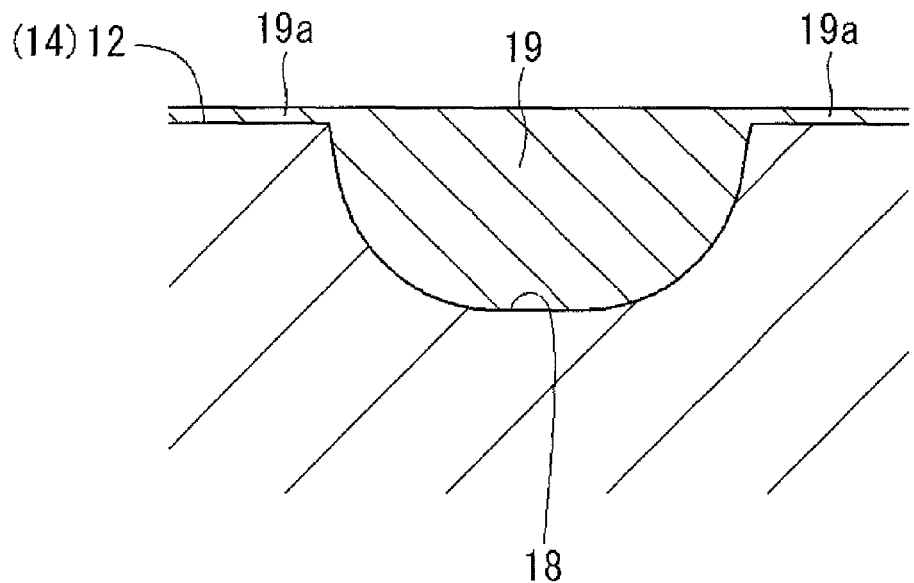
FIG. 5 is an explanatory diagram illustrating a state where a solid lubricant is retained in each outside dimple and a film of the solid lubricant is formed on portions other than the outside dimples, by an electrodeposition treatment process according to the embodiment of the invention.
Figure 6:
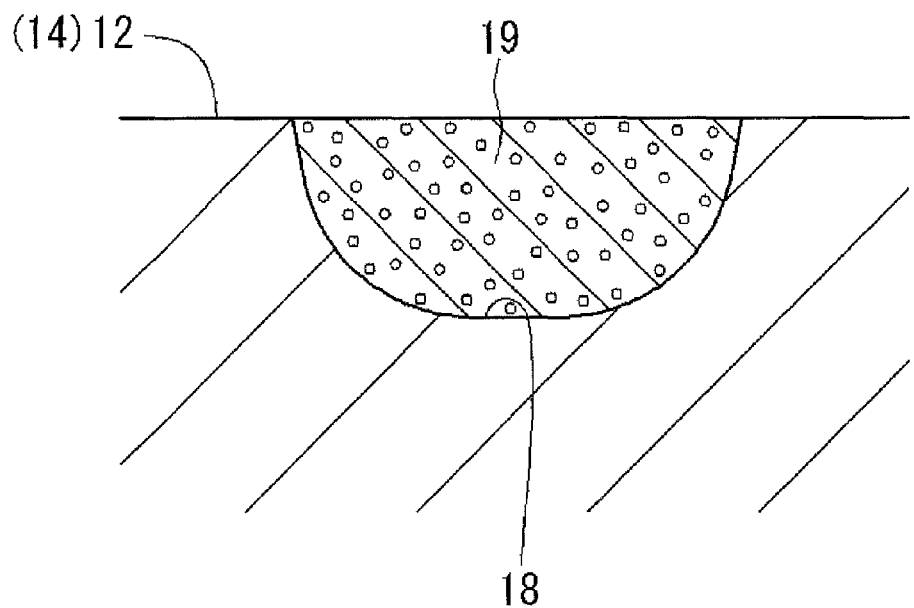
FIG. 6 is an explanatory diagram illustrating a state where the film of the solid lubricant is removed by super finishing such as aero-lapping and the solid lubricant is baked, thereby becoming porous.

As illustrated in FIG. 4, a liquid lubricant 17 such as lubricating oil or grease is retained in each of the inside dimples 16. A solid lubricant 19 such as polytetrafluoroethylene (PTFE) or MoS2 is retained in each of the outside dimples 18. The solid lubricant 19 is provided in the form of a film on sections outside the sections where the inside dimples 16 are formed, by an electrodeposition treatment process. At this time, the sections where the inside dimples 16 are formed and the contact region 13 are masked. Due to the electrodeposition treatment process of the solid lubricant 19, the solid lubricant 19 is retained in each of the outside dimples 18 and a film 19a of the solid lubricant is formed on portions other than the outside dimples 18, as illustrated in FIG. 5. The film 19a of the solid lubricant is removed by super finishing such as aero-lapping (refer to FIG. 6). After the electrodeposition treatment process of the solid lubricant 19, the solid lubricant 19 is baked at a low baking temperature of approximately 150° C., so that the solid lubricant 19 is made porous. It is desirable to make it possible to impregnate the solid lubricant 19 with a liquid lubricant by making the solid lubricant 19 porous.

The deep groove ball bearing used as the rolling bearing according to the present embodiment is configured as described above. Due to such a configuration, when the contact ellipse 40 falls within the contact region 13 because a light load is applied to each of the balls 31, the liquid lubricant 17 retained in the inside dimples 16 gradually flows out to the contact region 13, thereby contributing to the lubrication. That is, the lubrication is performed with a small amount of the liquid lubricant 17. When the outer edges of the contact ellipse 40 extend into the non-contact regions 14 and enter the regions where the inside dimples 16 are formed because a medium load is applied to each of the balls 31, the pressure of the balls 31 directly acts on the inside dimples 16. Therefore, the liquid lubricant 17 in the inside dimples 16 easily exudes under the pressure of the balls 31. Specifically, the pressure of the balls 31 acts more strongly on the inner side (the contact region 13 side) than on the outer side in the raceway surface. Therefore, because the liquid lubricant 17 is retained in the inside dimples 16, even if a small amount of the liquid lubricant 17 is in the inside dimples 16, the liquid lubricant 17 in the inside dimples 16 easily exudes, and thus an oil film for lubrication is efficiently formed. That is, although the amount of the liquid lubricant 17 in the inside dimples 16 is small, the liquid lubricant 17 in the inside dimples 16 is effectively used. Therefore, although the size of the contact ellipse 40 increases, it is possible to perform adequate lubrication while suppressing the amount of the liquid lubricant 17 used.

In addition, when the outer edges of the contact ellipse 40 enter the regions where the outside dimples 18 are formed because a heavy load is applied to each of the balls 31, the solid lubricant 19 in the outside dimples 18 also contributes to the lubrication. Therefore, although the size of the contact ellipse 40 increases, lubrication is performed without increasing the amount of the liquid lubricant 17 used. As described above, when the outer edges of the contact ellipse 40 enter the regions where the outside dimples 18 are formed, the liquid lubricant 17 and the solid lubricant 19 are used in combination as the lubricant. Therefore, although the amount of liquid lubricant 17 is reduced to suppress stirring resistance, it is possible to suppress occurrence of seizure due to reduction in the lubricating property.

As described above, according to the present embodiment, because lubrication is efficiently performed with the use of a small amount of the liquid lubricant 17, stirring resistance is suppressed. Further, because only the raceway surface needs to be processed to achieve such a configuration, a special mechanism is unnecessary and increases in the weight and size of the bearing are suppressed. In addition, because the solid lubricant 19 is supplied only in the outside dimples 18, an adverse effect on heat dissipation characteristics and an adverse effect on lubrication due to abrasion powder from the use of the solid lubricant 19 are also suppressed.

In the present embodiment, the inside dimples 16 are formed in the non-contact regions 14. Alternatively, the inside dimples 16 may be formed in the contact region 13. In this case, because the pressure that the inside dimples 16 receive from the balls 31 becomes larger, the liquid lubricant 17 more easily exudes from the inside dimples 16. As a result, it is possible to more efficiently perform lubrication with the use of the liquid lubricant 17. In this case, as long as the outside dimples 18 are formed in sections outside the section where the inside dimples 16 are formed, the outside dimples 18 may also be formed in the contact region 13.

Further, by making the solid lubricant 19 porous and impregnating the solid lubricant 19 with the liquid lubricant, it is possible to improve the lubrication performance. Specifically, because the solid lubricant 19 is made porous, the solid lubricant 19 is able to retain the liquid lubricant. Therefore, after the liquid lubricant flows out of the solid lubricant 19, lubrication is performed with the use of the solid lubricant 19. Thus, it is possible to attain a longer service life of the rolling bearing and improve the lubrication performance.

The invention is not limited to the embodiment described above, and may be implemented in various other embodiments within the scope of the invention. For example, in the embodiment described above, a large number of the inside dimples 16 and a large number of the outside dimples 18 are formed in the inner ring raceway surface 12. Alternatively, the invention may be implemented in an embodiment where a large number of the inside dimples 16 and a large number of the outside dimples 18 are formed in the inner ring raceway surface 12 and/or the outer ring raceway surface 22. In the embodiment described above, the rolling bearing is a deep groove ball bearing.

Alternatively, the rolling bearing may be an angular contact ball bearing or a roller bearing. Note that, when the rolling bearing is a roller bearing, each roller is formed in a crowning shape.

With the configuration described above, by impregnating the porous solid lubricant with the liquid lubricant, it is possible to improve the lubrication performance.

What is claimed is:

1. A rolling bearing, comprising:

an inner ring;

an outer ring arranged radially outward of the inner ring via an annular space so as to be concentric with the inner ring; and a plurality of rolling elements rollably disposed between an inner ring raceway surface formed on an outer peripheral face of the inner ring and an outer ring raceway surface formed on an inner peripheral face of the outer ring, wherein a plurality of inside dimples in which a liquid lubricant is retained and a plurality of outside dimples in which a solid lubricant is retained are formed in at least one of the inner ring raceway surface and the outer ring raceway surface, the inside dimples are formed in a section being close to a contact region at which at least one of the inner ring raceway surface and the outer ring raceway surface contact the rolling elements, and the outside dimples are formed outside a portion in which the inside dimples are formed.

2. The rolling bearing according to claim 1, wherein the solid lubricant retained in the outside dimples is a porous solid lubricant.

\* \* \* \* \*